United States Patent
Fisher et al.

(10) Patent No.: US 8,064,068 B2
(45) Date of Patent: Nov. 22, 2011

(54) MULTI-SOURCE SENSOR FOR THREE-DIMENSIONAL IMAGING USING PHASED STRUCTURED LIGHT

(75) Inventors: Lance K. Fisher, Excelsior, MN (US); Paul R. Haugen, Bloomington, MN (US)

(73) Assignee: CyberOptics Corporation, Golden Valley, MN (US)

(*) Notice: Subject to any disclaimer, the term of this patent is extended or adjusted under 35 U.S.C. 154(b) by 485 days.

(21) Appl. No.: 12/358,420

(22) Filed: Jan. 23, 2009

(65) Prior Publication Data
US 2009/0190139 A1  Jul. 30, 2009

Related U.S. Application Data

(60) Provisional application No. 61/023,575, filed on Jan. 25, 2008.

(51) Int. Cl.
*G01B 11/24* (2006.01)
(52) U.S. Cl. .......................... 356/603; 382/147; 382/154
(58) Field of Classification Search .................. 356/603; 250/559.22; 382/147, 154
See application file for complete search history.

(56) References Cited

U.S. PATENT DOCUMENTS

| | | | |
|---|---|---|---|
| 5,135,309 A | 8/1992 | Kuchel et al. | 356/376 |
| 6,049,384 A | 4/2000 | Rudd et al. | 356/376 |
| 6,639,685 B1 | 10/2003 | Gu et al. | 356/603 |
| 6,690,474 B1 | 2/2004 | Shirley | 356/603 |
| 6,724,489 B2* | 4/2004 | Freifeld | 356/601 |
| 6,937,350 B2 | 8/2005 | Shirley | 356/630 |
| 6,952,270 B2 | 10/2005 | Shirley | 356/603 |
| 7,164,789 B2 | 1/2007 | Chen et al. | 382/154 |
| 7,242,484 B2 | 7/2007 | Shirley | 356/603 |
| 7,389,199 B2 | 6/2008 | Troxler et al. | 702/156 |
| 7,440,590 B1 | 10/2008 | Hassebrook et al. | 382/108 |
| 2002/0054299 A1* | 5/2002 | Freifeld | 356/625 |
| 2004/0174541 A1* | 9/2004 | Freifeld | 356/614 |

FOREIGN PATENT DOCUMENTS

| | | |
|---|---|---|
| EP | 0551955 A1 | 1/1993 |
| WO | WO 01/50760 A1 | 7/2001 |

OTHER PUBLICATIONS

International Search Report and Written Opinion for international patent application No. PCT/US2009/031786, dated May 8, 2009.

* cited by examiner

*Primary Examiner* — Roy M Punnoose
(74) *Attorney, Agent, or Firm* — Christopher R. Christenson; Westman, Champlin & Kelly, P.A.

(57) ABSTRACT

A system for sensing a three-dimensional topology of a test surface is provided. A first illumination source generates first patterned illumination from a first point of view. A second illumination source generates second patterned illumination from a second point of view, the second point of view differing from the first point of view. An area array image detector simultaneously acquires at least first and second fringe images relative to the first and second patterned illuminations. A controller is coupled to the first and second sources and to the detector. The controller generates a height topology of the test surface based on images acquired while the first and second patterned illuminators are energized.

14 Claims, 6 Drawing Sheets

MULTI-SOURCE SENSOR FOR THREE-DIMENSIONAL IMAGING USING PHASED STRUCTURED LIGHT

CROSS-REFERENCE TO RELATED APPLICATION

The present application is based on and claims the benefit of U.S. provisional patent application Ser. No. 61/023,575, filed Jan. 25, 2008, the content of which is hereby incorporated by reference in its entirety.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Circuit boards that carry electronic integrated circuits as well as discrete electronic components are well known. A circuit board substrate is prepared with predetermined conductor paths and pads for receiving the leads of electronic components such as integrated circuit chips, resistors or capacitors. During the circuit board fabrication process, solder paste bricks are placed onto the board substrate at appropriate positions. The solder paste bricks are usually applied by placing a screen onto the substrate, applying solder paste through the screen openings and removing the screen from the substrate. The circuit board electronic components are then positioned onto the substrate, preferably with a pick and place machine, with leads of the electronic components placed on the respective solder paste bricks. The circuit board is passed through an oven after all of the components are positioned on the substrate to melt the solder paste thus creating an electrical as well as mechanical connection between the components and the substrate.

The size of the solder paste bricks and the accuracy with which they must be placed on the substrate has become increasingly smaller and tighter with the increased emphasis on miniaturization in the electronics industry. Solder paste brick heights can be as small as 100 microns and the height of the solder paste brick must often be measured to within 1 percent of the designed height and size. The center-to-center spacing between solder bricks is sometimes as little as 200 microns. Too little solder paste can result in no electrical connection between the lead of an electronic component and the pad of the circuit board substrate. Too much paste can result in bridging and short-circuiting between the leads of a component.

A single circuit board can cost thousands and even tens of thousands of dollars to manufacture. Testing of a circuit board after the fabrication process is complete can detect errors in solder paste placement and component lead connection, but often the only remedy for a faulty board is rejection of the entire board. It is accordingly imperative that a circuit board be inspected during the fabrication process so that improper solder paste placement can be detected prior to the placement of the electronic components onto the substrate. Such in-process solder inspection reduces the cost of failure since expensive components have not yet been placed onto the circuit board.

Current solder paste inspection systems that employ phased profilometry have some limitations. The use of white light phased profilometry is a well known for optically acquiring topological surface height data. Typical phase profilometers used to acquire height topologies of test surfaces generally use triangulation principles combined with structured light to determine the height of the surface at every point defined by the sensor's imager. One limitation of using triangulation sensing to produce a height image of a test surface is that the source and receive optics use separate optical axes. If the test surface has height features that have an edge slope large enough that they occlude either the source or receive optical path relative to some area on the surface, the sensor will not be able to measure those areas of the surface.

One approach to mitigate the triangulation shadow effect is to use multiple sources with a normally incident single receive triangulation configuration. Each of the sources illuminates the test surface from different incident angles. If one source is occluded, or otherwise blocked, from an area of the test surface, there is a high probability that the other source will be able to illuminate that area. To capture height information, the receive sensor acquires images from each of the sources serially and then combines the results of the multiple height images to ensure all areas of the test surface contain valid height data. Typically, this will require the sensor to be stationary and will require a separate image to be acquired for each of the sources. One disadvantage to this approach is that it requires multiple image acquisition cycles to generate a single height image, which slows down the overall acquisition process when compared to a sensor that uses a single source. Implementation of multiple source white light phase triangulation sensors requires the sources to be turned on one at a time so that the image from one source, followed by acquisition of an image from another source can be acquired in sequence by the receive detector. This operation will typically require two or more image acquisition cycles of the sensor to acquire height data from all areas of the image.

Providing a multi-source sensor for three dimensional imaging using phased structured light that does not have the associated cost or speed penalty that is present in the current state of the art for multiple art phase profilometers would represent a useful advance to high-speed three-dimensional inspection.

SUMMARY

A system for sensing a three-dimensional topology of a test surface is provided. A first illumination source generates first patterned illumination from a first point of view. A second illumination source generates second patterned illumination from a second point of view, the second point of view differing from the first point of view. An area array image detector simultaneously acquires at least first and second fringe images relative to the first and second patterned illuminations. A controller is coupled to the first and second sources and to the detector. The controller generates a height topology of the test surface based on images acquired while the first and second patterned illuminators are energized.

DETAILED DESCRIPTION OF ILLUSTRATIVE EMBODIMENTS

Figure 1:
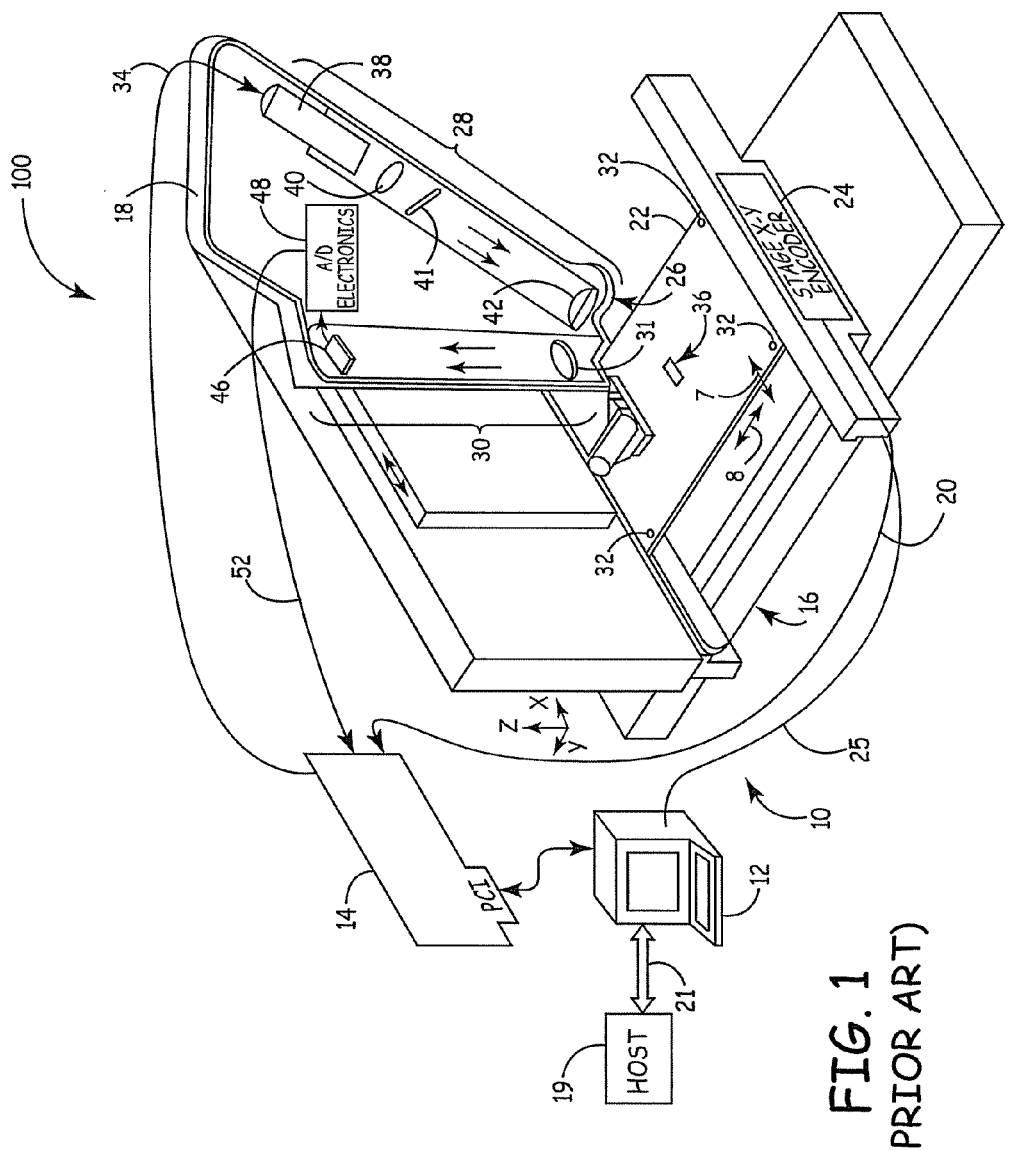
FIG. 1 is a diagrammatic view of a phase profilometer in accordance with the prior art.

FIG. 1 is a diagrammatic view of a phase profilometer in accordance with the prior art. FIG. 1 represents a system upon which improvements in accordance with embodiments of the present invention can be easily incorporated. Accordingly, FIG. 1 will be described in detail.

FIG. 1 shows solder paste inspection system 10, which includes processor 14, X-Y system 16 and optical sensor system 18. Solder paste inspection system 10 is coupleable to host device 19 through network 21 or the like, in order to send and receive information related to solder inspection on printed circuit boards. For example, system 10 may receive location information relating to specific solder paste locations, and their respective nominal volumes. Preferably, processor 14 is disposed within microcomputer 12, which microcomputer 12 is a known device having an input such as a keyboard, and mouse, and an output in the form of a video monitor. Additionally, microcomputer 12 preferably includes an industry-standard architecture and microprocessor. One example is a personal computer running a Microsoft Windows® operating system.

Processor 14 is preferably embodied upon a computer peripheral card with an industry-standard form factor. Further, processor 14 is preferably adapted to couple to microcomputer 12 through a standard Peripheral Component Interconnect (PCI) bus. Processor 14 can then transfer data to and from microcomputer 12 using a known Direct Memory Access (DMA) transfer method to facilitate high-speed data transfer.

Processor 14 receives the digital video data from analog/digital electronics 48 and performs a number of functions on such data. For example, processor 14 triggers sensor system 18 to acquire images based upon encoder information received from encoders 24 through line 20. Processor 14 also communicates with sensor system 18 in order to control its operational mode (i.e., high-resolution vs. high-speed). Processor 14 receives previously digitized video data from sensor system 18 for storage in a frame buffer (not shown). Processor 14 operates upon the digitized video images to correct for defects in the particular CCD array 46 in sensor system 18. Processor 14 is also used to compensate for effects of known optical distortions on the height map.

Processor 14 is coupled to X-Y system 16 through line 20. X-Y system 16 also includes X and Y motors (not shown) which position circuit board 22 in respective X and Y axes. X and Y motors are operably coupled to X and Y encoders (shown diagrammatically at block 24) to provide data indicative of circuit board position along X and Y axes to processor 14. Motion commands are sent over line 25 to system 16. System 16 is extraordinarily stable and its motion is controlled to within approximately one micron over approximately 280 microns of distance traveled. If system 16 is not sufficiently stable, additional processing in the electronics may be needed to provide equivalent accuracy and repeatability. Each of the linear encoders may have a resolution of about 0.5 um, as can be purchased from Renishaw. Thus, through cooperation, computer 12 and X-Y system 16 precisely move circuit board 22 as desired in the X and Y directions at arrows 7, 8 respectively.

Optical sensor system 18 includes camera system 30, projection system 28, circular illuminator 26, and laser range finder 29. Camera system 30 includes camera lens 31, a detector 46, and a set of A/D electronics 48. Projection system 28 includes flashlamp 38, condenser lens 40, reticle 41, and projector 42. System 18 is fixedly attached to a translation stage (not shown) to provide z movement for focus control.

Figure 2:
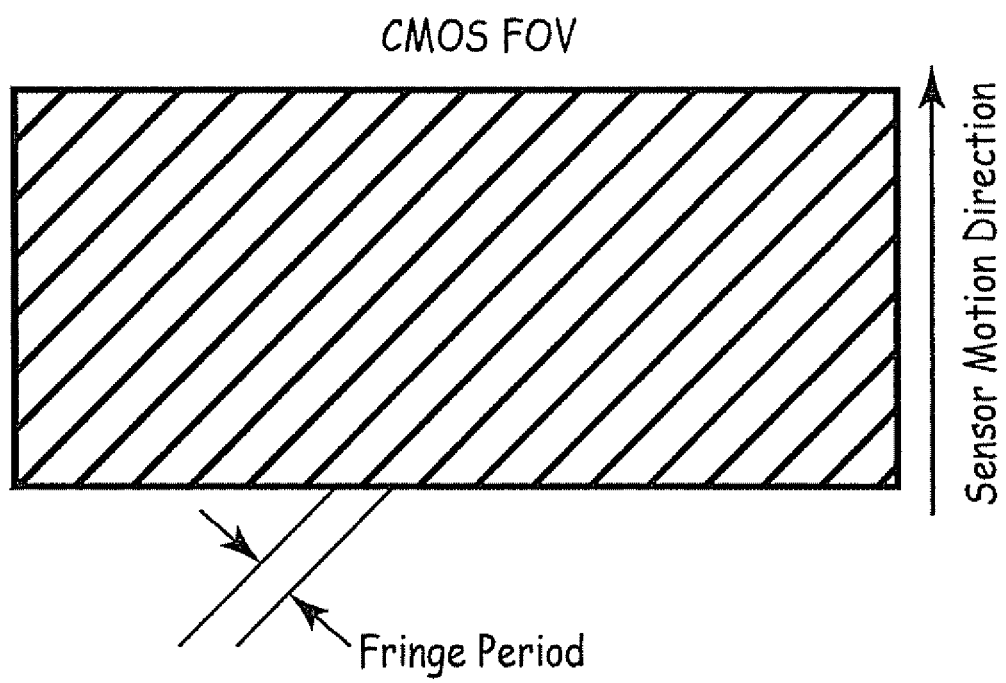
FIG. 2 is a diagrammatic image of a single spatial frequency fringe pattern used in accordance with the prior art.

Projection system 28, in combination with the stage movement, projects three phases of structured light onto solder paste features 36. Flashlamp 38 is generally a high-speed strobe lamp filled with xenon gas, projecting broadband white light. A high speed discharge circuit (not shown) within system 18 drives lamp 38, as timing signals through channel 34 cause lamp 38 to fire three times within a short period of time, preferably at least one millisecond between strobes in order to ensure that the flashlamp remains stable. High speed discharge circuits capable of providing three flashes within such a short time are known and ensure high system throughput. Other types of illumination sources are usable with embodiments of the present invention, such as a pulsed laser or a pulsed LED, as long as they are able to provide short duration, high energy successive pulses within the preferred time period. Condenser lens 40 collects light from the flashlamp 38 and directs it through reticle 41 to the projector lens 42, which forms a sinusoidally varying fringe image on the solder deposits 36. Reticle 41 has an astigmatic pattern and the projector lens is astigmatic, together reliably forming sinusoidally varying astigmatic patterns with low harmonic distortion as shown in FIG. 2.

Projector lens system 28 is generally doubly telecentric, in that it is telecentric in reticle space and target space (at solder paste deposits 36 on board 22). The double telecentricity is important since it allows the height, volume and area calculations to be independent of the location of the solder paste within the field of view and depth of focus. This characteristic also provides lower distortion for the system as a whole, which is important because the target moves between exposures.

Camera system 30 views the projected fringes on the target of solder paste deposits 36, and acquires and digitizes images in rapid succession. Camera system 30 does not include a grating, as is incorporated in Moire interferometry systems. Preferably, camera system 30 is telecentric in target space and has low distortion for the same reasons given above. The size of the field of view is selected to maximize the field coverage while still maintaining sufficient resolution of the target. CCD array 46 is a megapixel array and as such is able to inspect solder paste features of fine detail. For example, solder features for components such as a Chip Scale Package (CSP) or a microball grid array can be inspected. However, by sampling or combining individual pixels, larger equivalent pixels can be generated which facilitates inspection at higher speeds. One way that such sampling is done is by decimating the photo-charge of four pixels into an equivalent pixel within CCD array 46 itself. This decimation provides a faster CCD image readout rate than that attainable with standard resolution (two times faster) and thus reduces subsequent processing time. In one embodiment, the inspection mode can be rapidly switched between the high-resolution mode and the high-speed mode for different solder paste features on the same board, based upon the type of components that will be found in different areas of board 22. As such, optical sensor system 18 employs a dual-resolution capability in the same unit.

CCD 46 can be a 1024×1024 pixel area array CCD image sensor, where each pixel generates charge in response to light exposure. The CCD array 46 can be a multi-tap CCD array providing image data through four taps at a rate of 20 megapixels per second, per tap. Thus, CCD array 46 is able to provide image data at a rate of 80 megapixels per second. CCD array 46 can be a commercially available CCD array such as the model THX7888, available from Thomson-CSF Semiconductor. Camera system 30 samples the target at a pitch of 20 microns square on the target surface.

In the system described with respect to FIG. 1, the structured light generator projects the image of a reticle 41 onto the test surface. The reticle contains an intensity mask that when projected onto the surface 22, produces a sinusoidal intensity pattern on test surface 36. At a different angle, an image of the sinusoidal pattern is acquired by camera 46. Variations, or phase differences, in the pattern are used to determine the height of test surface 36 at each point in the image. Essentially, the sensor is moved relative to the test surface and the multiple images required to generate the phase map are acquired in sequence as the sensor is moved. A diagrammatic image of a single spatial frequency fringe pattern used in accordance with the prior art is illustrated in FIG. 2. The method of converting the intensity information from the multiple sinusoidal intensity pattern images to actual height images can be in accordance with any known techniques, such as those described in U.S. Pat. No. 6,750,899.

Figure 3:
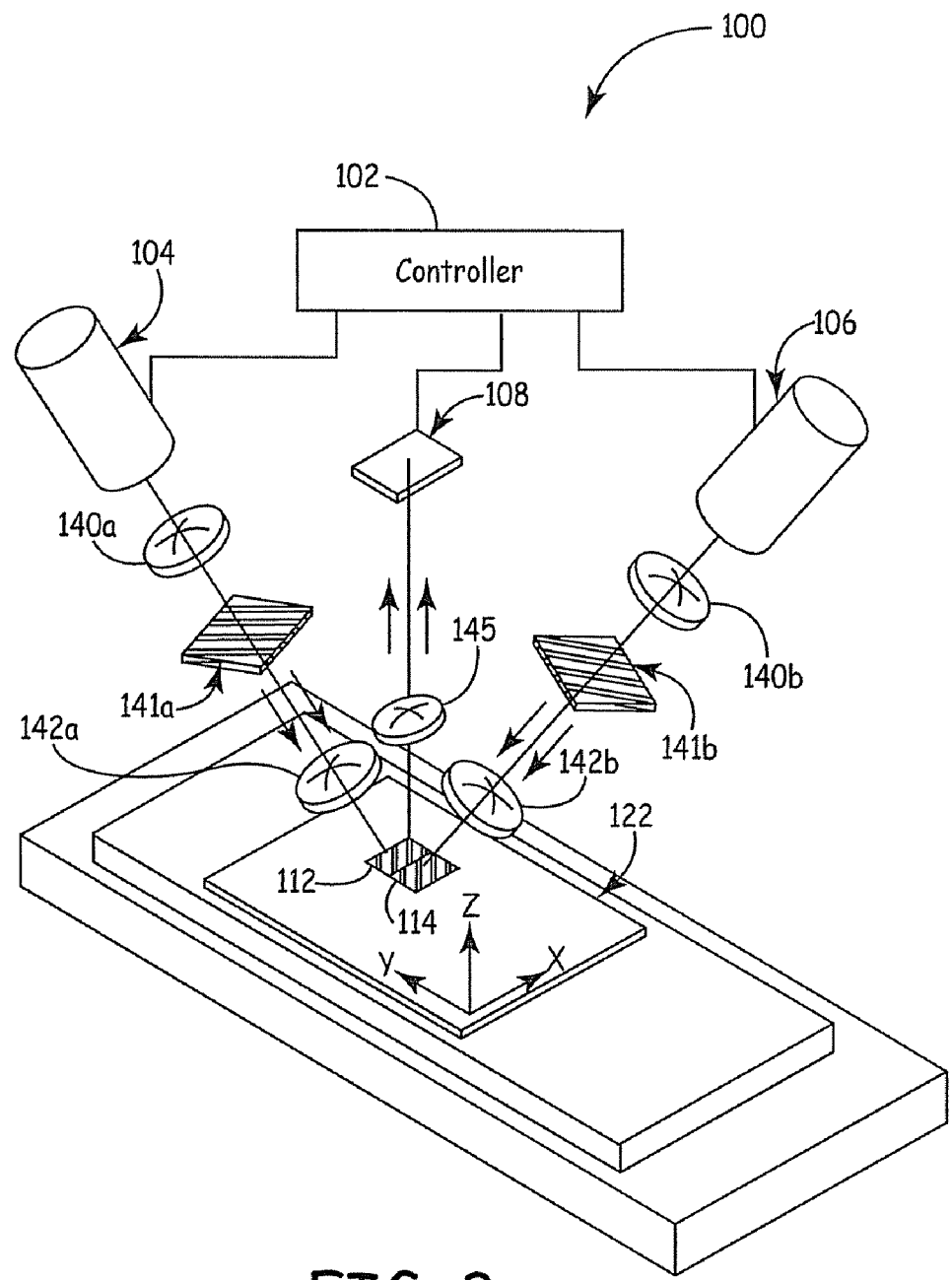
FIG. 3 is a diagrammatic view of a multi-source sensing system for three-dimensional imaging using phased structured light in accordance with an embodiment of the present invention.

FIG. 3 is a diagrammatic view of a multi-source sensing system for three-dimensional imaging using phased structured light in accordance with an embodiment of the present invention. System 100 includes controller 102 operably coupled to first and second sources 104, 106 respectively. Additionally, controller 102 is coupled to image acquisition device 108, which is preferably a CMOS (Complementary Metal Oxide Semiconductor) detector. As illustrated in FIG. 3, each of first and second structured light sources is configured to direct a fringe pattern upon test surface 122, which may be a printed circuit board, from different points of view. Each of first and second structured light source preferably comprises source optics 140a, 142a, 140b, and 142b, respectively as illustrated in FIG. 3. Optics 140a, 140b, 142a, and 142b can be similar to those described in FIG. 1 at reference numerals 40 and 42. Each of sources 104, 106 directs its illumination through a respective reticle 141a, 141b, to impart a preferably sinusoidally varying intensity pattern upon the illumination. As illustrated in FIG. 3, first source 104 directs its structured light pattern to location 112, which is directly adjacent structured illumination pattern 114 provided by second illumination source 106. Further, the interface between structured illumination patterns 112 and 114 is preferably aligned with the x axis, thereby allowing scanning, in accordance with embodiments of the present invention, in the y direction.

Figure 4:
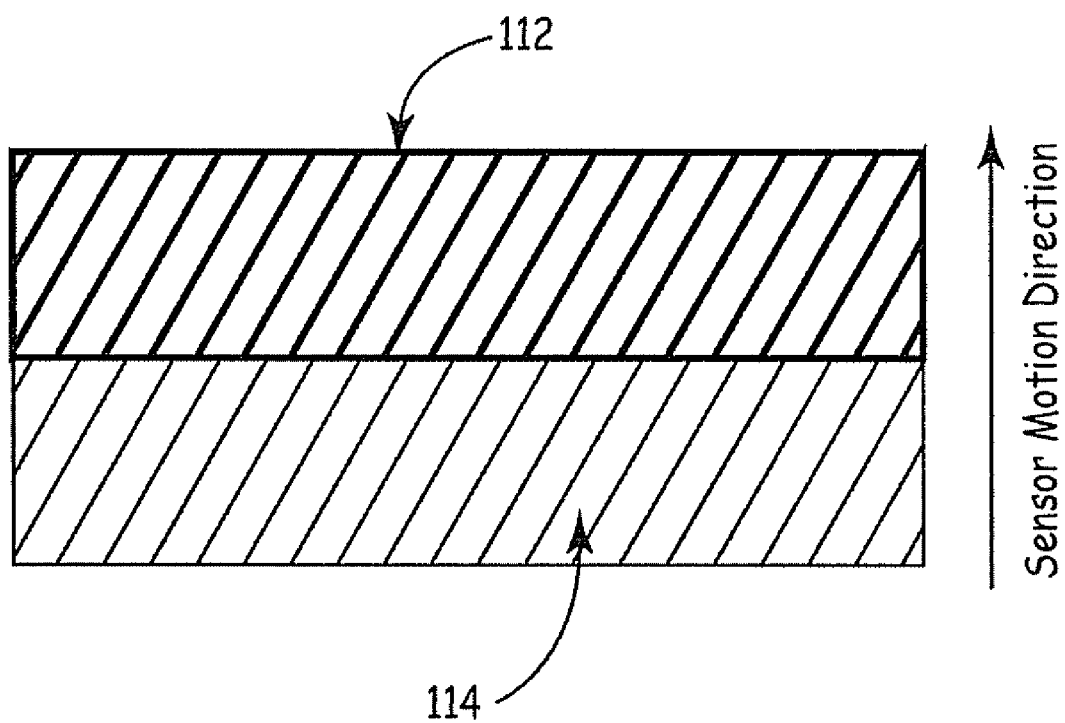
FIG. 4 is a diagrammatic view of multiple fringe images generated by separate sources in accordance with an embodiment of the present invention.

In the embodiment illustrated in FIG. 3, two sources 104, 106 are employed to produce separate images of a fringe pattern on test surface 122. Fringe images 112, 114 generated by separate sources 104, 106, respectively, are arranged as shown in FIG. 4 with the image 112, 114 adjacent and in line with the scan direction (y) of the sensing system 100.

By projecting more than one fringe image simultaneously and using area array detector 108, such as a CMOS camera, the images of the two sources 104, 106 can be acquired through receive optics 145, and processed separately as two distinct height maps at the same time. For each image acquisition cycle, the height image generated by the two fringe images 112, 114 represent different areas on test surface 122. However, because sensing system 100 is moving relative to test surface 122, the resulting height images generated by source 104 will acquire a height image of the same area of the test surface as the illumination source 106 on the next image acquisition cycle. Since the sensing system with this optical architecture is required to move relative to test surface 122 to produce height maps, there is no time penalty for acquiring the two, or more, height images. For each source 104, 106, the method of converting the intensity information from the multiple images to actual height images can be in accordance with any known techniques, such as those described in U.S. Pat. No. 6,750,899. Once the height information for a test surface has been acquired from each of sources 104, 106, the height images can be compared and combined, as desired, to ensure that there is valid height data over the entire image.

Figure 5:
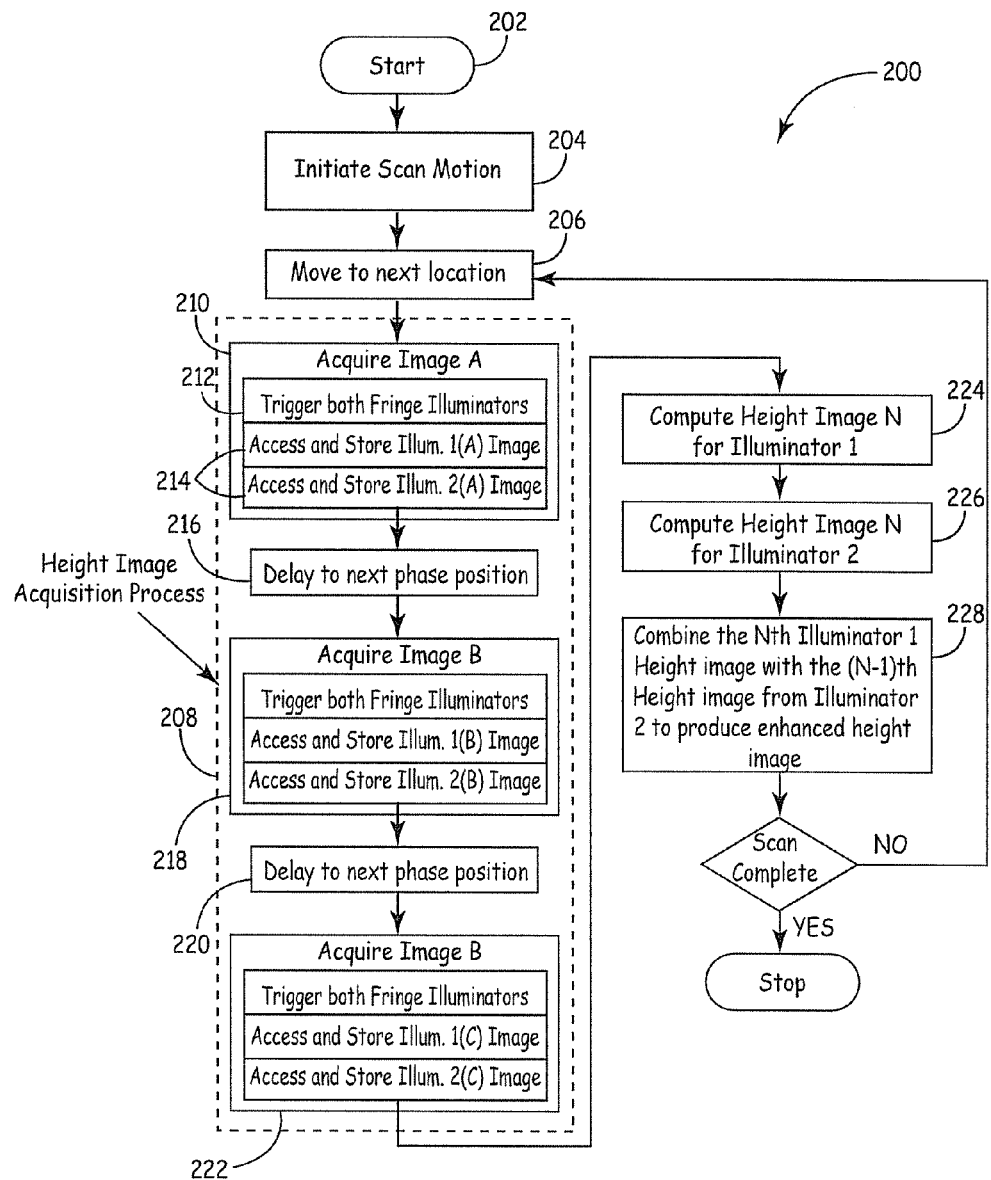
FIG. 5 is a diagrammatic view of a method of inspecting height of a test surface using multiple sources in accordance with an embodiment of the present invention.

FIG. 5 is a diagrammatic view of a method of inspecting height of a test surface using multiple sources in accordance with an embodiment of the present invention. Method 200 begins at block 202 and continues to block 204 where the sensing system is directed to begin its scan motion in the scan direction. In the embodiment illustrated in FIG. 3, the scan motion is the y-axis direction. Block 204 continues until the sensing system has reached the next image location as illustrated at block 206. Once the location required by block 206 has been achieved, the image acquisition process (illustrated in phantom at block 208) begins. The first portion of block 208 includes acquisition block 210 where a first fringe image is acquired. Specifically, both fringe illuminators 104, 106 are energized and direct their respective fringe patterns upon test surface 122, as indicated at block 212. Next, the image acquisition device, such as CMOS detector 108, is triggered to acquire an image of the simultaneously-projected fringe patterns 112, 114 as indicated at blocks 214. Since each of blocks 214 executes during the same image acquisition cycle, they can be considered to be performed simultaneously. Once the image of the multiple fringe patterns is acquired, the image is stored in suitable memory such as memory within the CMOS detector itself. Once image A (comprised of multiple fringe patterns in a first phase) has been acquired, method 200 continues at block 216 where a delay is caused until motion of the sensing system 100 reaches the next phase position. Typically, for a three-phase image acquisition (acquiring three images A-C) the phase positions are 120 degrees apart. This is equivalent to one-third of the fringe period of one, or both, of the reticles 141a, 141b. Once the next phase position has arrived, block 218 executes in much the same manner as block 210. Accordingly, each of sources 104, 106 is engaged simultaneously to project their respective structured-light patterns 112, 114 upon the test surface. Then, an image is acquired by CMOS detector 108 which is also preferably stored in buffer memory of the CMOS detector 108. After image B (comprised of multiple fringe patterns in a second phase) has been acquired in block 218, a second delay, as illustrated in block 220, is set until the sensing system 100 reaches the next phase position (such as 240 degrees). Once the next phase position of block 220 has been reached, then image acquisition block C (as illustrated at reference numeral 222) is executed. Upon the completion of block 222, the image acquisition device will preferably contain, in its buffer, three distinct images, where each image includes both fringe images 112, 114 disposed next to each other for one of the three phases. At block 224, a height image N for the first source 104 is created by taking a first half of each of the three (A, B, C) images to isolate first reticle pattern 112 in images A-C. In accordance with known techniques, these image portions are combined to generate a height image N from the perspective of source 104. Next, block 226 executes to do precisely the same thing with respect to fringe image 114 from source 106. Once block 226 has completed and the height image N for source 106 has been computed, control then passes to block 228. At block 228, the N height image for source 104 is combined with the (N−1)th height image from source 106 to produce an enhanced height image. Certainly, on the very first execution of block 228 (when N=1) block 228 is simply skipped. However, on subsequent executions of block 228, this provides an ability to discern, or otherwise detect, when an object, such as a chip capacitor or integrated circuit, has occluded or otherwise blocked one of the height images. In such instance, the other can simply be substituted to provide the height image. Moreover, in the vast majority of cases where both height images are valid, the height images themselves can be compared and/or combined in any suitable manner, such as averaging, to provide a height value that has better repeatability.

Figure 6:
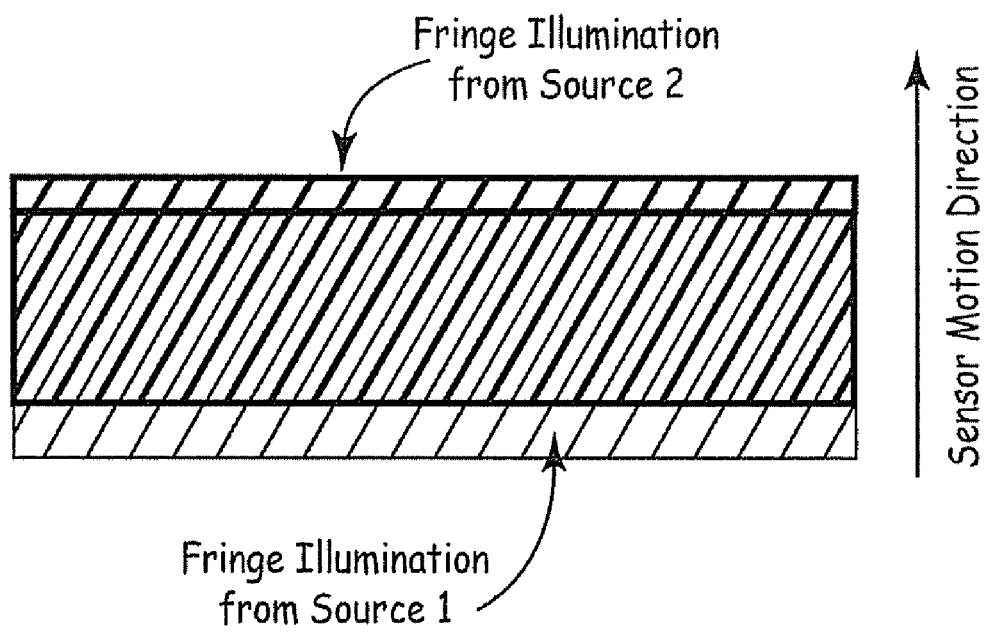
FIG. 6 is a diagrammatic view illustrating different fringe images overlapping each other in the direction of the sensor motion in accordance with an embodiment of the present invention.

While embodiments of the present invention have generally been described with respect to two fringe images that are adjacent one another and do not overlap, that is simply the preferred embodiment. In accordance with another embodiment of the present invention, the different fringe images can overlap each other in the direction of the sensor motion. This embodiment is illustrated diagrammatically in FIG. 6. In this embodiment, the centers of the fringe illuminator images are nearly coincident and aligned along the direction of the scan motion. In this embodiment, the fringes can be recognized by the CMOS detector by encoding the two fringes by wavelength (color) or in time by illuminating each fringe sequentially. Further still, embodiments of the present invention include fringe images where each fringe image has a different fringe period. In this case, the wrap height of the two sources can be chosen such that when combined the two height images and wrap position can be used to extend the height range of the sensor compared to when only one source height image is used. This helps provide the ability to generate usable height information for much larger components while still providing relatively high precision in the height information.

Although the present invention has been described with reference to preferred embodiments, workers skilled in the art will recognize that changes may be made in form and detail without departing from the spirit and scope of the invention. For example, while embodiments of the present invention generally describe the utilization of a CMOS detector, any suitable image acquisition device including a CCD array can be used.

What is claimed is:

1. A system for sensing a three-dimensional topology of a test surface, the system comprising:
    a first illumination source configured to generate first patterned illumination from a first point of view;
    a second illumination source configured to generate second patterned illumination from a second point of view, the second point of view differing from the first point of view;
    an area array image detector configured to simultaneously acquire at least first and second fringe images relative to the first and second patterned illuminations; and
    a controller coupled to the first and second sources and to the detector, the controller being configured to generate a height topology of the test surface based on images acquired while the first and second patterned illuminators are energized.

2. The system of claim 1, wherein the controller is further configured to ignore a portion of one of the first and second images if there is a shadow present in that image.

3. The system of claim 1 wherein images relative to the first and second illumination sources are averaged together to produce a combined height topology.

4. The system of claim 1, wherein the controller is configured to generate relative movement between the image detector and the test surface, and wherein each of the first and second illumination sources includes a strobe lamp.

5. The system of claim 4, wherein the controller is configured to generate the relative movement in a scan direction, and wherein the controller has a phase image acquisition cycle that includes engaging each of the first and second illuminators and acquiring a single image of the test surface while the first and second illuminators are engaged.

6. The system of claim 5, wherein the controller is configured to generate a plurality of phase image acquisition cycles.

7. The system of claim 6, wherein the relative movement between each image acquisition system is a fraction of a fringe period.

8. The system of claim 5, wherein each of the first and second patterned illuminations has a size in the scan direction, and wherein the controller is configured to generate relative movement, from a first position (N), to a subsequent scan position (N+1) that is displaced a distance from the first position approximately equal to the size in the scan direction of one of the first and second patterned illuminations.

9. The system of claim 8, wherein the controller is configured to compute the height topology based upon images of the first patterned illumination acquired during one image cycle (N) and images of the second patterned illumination acquired during a different cycle (N−1).

10. The system of claim 1, wherein the first and second patterned illuminations are disposed adjacent one another on the test surface.

11. The system of claim 1, wherein the first and second patterned illuminations overlap one another along a scan direction.

12. A method of three-dimensionally mapping an image of a test surface, the method comprising:
    projecting a first fringe image onto the test surface from a first point of view;
    projecting a second fringe image onto the test surface from a second point of view different from the first point of view;
    capturing a first plurality of fringe phase images of the test surface while the first and second patterned illuminations are disposed upon the test surface, wherein relative movement between the test surface and the fringe images results in a displacement between each fringe phase image capture that is a fraction of a fringe period;
    causing relative displacement between the test surface and the fringe images to an extent equal to a size of one of the first and second fringe images in a scan direction;

capturing a second plurality of fringe phase images of the test surface while the first and second patterned illuminations are disposed upon the test surface, wherein relative movement between the test surface and the fringe images results in a displacement between each fringe phase image capture that is a fraction of a fringe period; and computing a height map based upon the first and second plurality of fringe phase images.

13. The method of claim 12, wherein at least a portion of an image is discarded if it is determined to contain a shadow.

14. The method of claim 12, wherein the first and second plurality of fringe phase images are used to provide an averaged height map.

* * * * *